United States Patent [19]

Breu et al.

[11] Patent Number: 4,638,126

[45] Date of Patent: Jan. 20, 1987

[54] CRADLE SWITCH FOR A TELEPHONE APPARATUS

[75] Inventors: Karl-Jan Breu, Groebenzell; Hans-Joachim Schinke, Munich, both of Fed. Rep. of Germany

[73] Assignee: Siemens Aktiengesellschaft, Berlin and Munich, Fed. Rep. of Germany

[21] Appl. No.: 669,758

[22] Filed: Nov. 9, 1984

[30] Foreign Application Priority Data

Nov. 25, 1983 [DE] Fed. Rep. of Germany ....... 3342730

[51] Int. Cl.⁴ .............................................. H04M 1/08
[52] U.S. Cl. ..................................... 379/427; 379/425
[58] Field of Search ................... 179/164, 159, 100 R, 179/100 D

[56] References Cited

U.S. PATENT DOCUMENTS 2,754,371 7/1956 Droel .............................. 179/100 D
2,757,241 7/1956 Droel .............................. 179/100 D

FOREIGN PATENT DOCUMENTS 1151020 7/1963 Fed. Rep. of Germany ...... 179/164
1437940 2/1969 Fed. Rep. of Germany ...... 179/164
0170657 10/1982 Japan .............................. 179/100 R Primary Examiner—Thomas W. Brown
Attorney, Agent, or Firm—Hill, Van Santen, Steadman & Simpson

[57] ABSTRACT

A cradle switch, which is used with a telephone apparatus having a housing with an opening and a cradle adjacent the opening, characterized by a housing having contact assemblies, an actuating lever pivotally connected onto the housing and a switch member pivotally connected to the actuating lever and extending through the opening and into the cradle of the apparatus. The pivotal connection is releasable and allows both axial and pivotal displacement and thus makes a separate step of capturing the switch member or plunger on a housing of a telephone superfluous.

8 Claims, 6 Drawing Figures

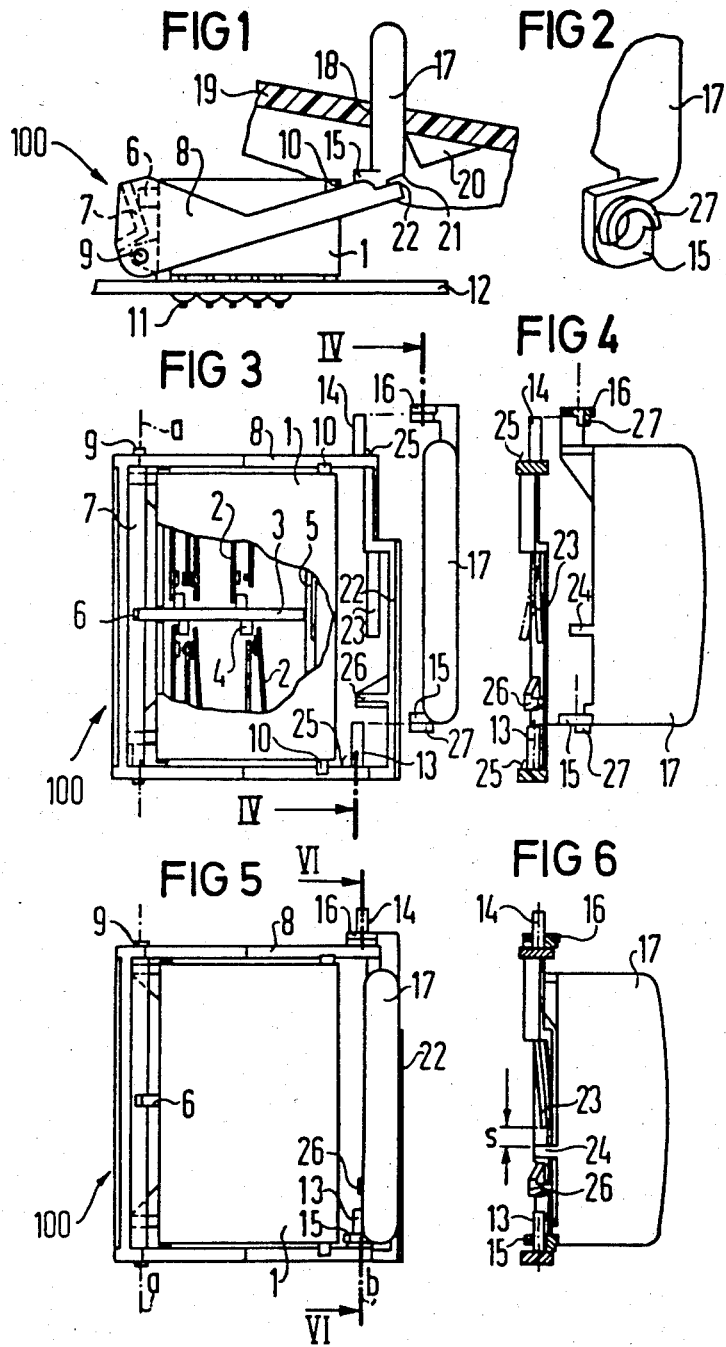

CRADLE SWITCH FOR A TELEPHONE APPARATUS

BACKGROUND OF THE INVENTION

The present invention is directed to a cradle switch for a telephone apparatus, which has a housing with an opening in a wall and a cradle at the opening. The switch includes a carrier having movable switch contacts, an actuating lever mounted at one end to the carrier for pivotal movement to activate the contacts and a switch member, which extends through the opening in the wall of a housing and into the cradle, engaging the lever to mechanically actuate or pivot the lever.

A carrier with spring contacts of a known cradle switch is designed as an injected synthetic part and contains contact springs which cooperate as spring assemblies. The actuation lever enables the excursion of the free ends of the contact springs of the spring assemblies by, for example, a control slide movable on a straight line in the contact carrier and thus enables a variation or switching of the contact positions.

What is referred to as a switching member are mechanical actuating elements, which may be a plunger, button or bar and which are accessible from the outside of the housing of the telephone. The elements can usually have their position in the housing opening influenced by means of lifting off or depositing the handset from or respectively onto the apparatus housing. The elements then transmit their movement caused by removing and replacing the handset in the cradle to the actuating lever of the cradle switch in the interior of the housing of the telephone apparatus.

Given a telephone, whose functional parts are to be allocated exclusively to a chassis, surrounded by a molded housing, it is considered undesirable for reasons of rational assembly to have the insertion of the switching members into the molded housing as a separate assembly operation in order to obtain a captive anchoring of these members in the housing of the apparatus.

SUMMARY OF THE INVENTION

The object of the present invention is to provide a feasible arrangement for the switching members which renders its captive fixing of the element in the opening in the housing wall of the telephone apparatus superfluous.

This object is achieved by an improvement in a cradle switch for a telephone apparatus having a housing with an opening in a wall and a cradle at the opening, said switch including a carrier having movable switch contacts, an actuating lever mounted at one end to the carrier for pivotal movement to actuate the contacts, and at least one switch member extending through the opening in the wall of the housing and into the cradle and engaging the lever to mechanically actuate the lever. The improvements are means for pivotally connecting said switch member for pivotal movement on a first axis b at a free end of the lever, said means guiding the member for longitudinal movement with axial play relative to the first axis b.

By providing means for pivotally connecting the switching member to the actuating lever of the cradle switch, anchoring of the switch member in the housing opening is superfluous. Thus, the separate assembly operation which was necessary for anchoring the switch member to the housing of the telephone after the simple manufacture of the housing by injection molding it of synthetic materials, is eliminated. Instead, when the outer housing of the telephone is put in place on the chassis which carries the cradle switch, the switching member which is pivotally connected in an axially displaceable fashion to the actuating lever can be introduced into the corresponding allocated opening in the wall of the housing from the inside.

The axis or axle around which the switching member is pivotally connected to the actuating lever in a pivotal and axially displaceable fashion can according to an advantageous improvement of the invention be disposed in parallel orientation at a distance to the pivot axis of the actuating lever which is pivotally mounted on the carrier. Preferably, the pivotal and axially displaceable connection between the actuating lever and the switching member can be designed as a releasable connection according to the present invention.

For the purpose of a releasable pivot connection of the switching member to the actuating lever, the actuating lever comprises a pair of parallel extending arms which are spaced apart a given distance. The two actuating levers are provided with two pivot pins, which embody the pivot axis for the switch member and the switch member has a pair of corresponding bearing eyelets or bores. It should be noted that these parts could be reversed with the bearing bores or eyelets being provided on the actuating levers and the two pivot pins being provided on the switching member.

For the purpose of simplifying manufacture of the connection, the two pivot pins are preferably provided on the pair of actuating arms and have their free ends oriented to extend in the same direction. In this case, the connection to the switching member can be produced by means of placing the two bearing bores in alignment with the pivot pins and then axially displacing the switch member in a direction so that the pins are received in the bearing bores.

For the purpose of a further simplification in the manufacturing of the pivot connection, the two bearing bores or eyelets of the switch member can be provided with respective collar-like projections on a lateral face facing the free ends of the bearing pins or pivot pins on which they are to be received. The projections are respectively semi-circular and surround the associated bore or eyelet. The bore equipped in such a fashion enables emplacement of the collar-like projections on the free ends of the pivot pins while moving the switch member in a direction at right angles relative to the pivot axis for the purpose of precentering the respective bores to the appertaining pin. Simultaneous introduction of the two pins into their respective bores becomes entirely unproblematical as a result of such a precentering.

In order for the switching member to be pivotally connected onto the actuating lever and to be captive, an elastic locking pin or deflectible stop which is oriented roughly parallel to the axis can be provided on one of the arms of the actuating levers between the two pivot pins for the switching member. The free end of this locking pin will point in the direction opposite to the pivot pins and is deflectible at right angles relative to the pivot axis of the pivotal connection. A detent web or projection corresponding to the locking pin can be provided between the two bearing bores on the switch member and this web is oriented to extend at right angles relative to the pivot axis. The locking pin and detent web will interact as latch elements so that the locking pin is at first elastically deflected or deformed by the edge of the detent web upon introduction of the pivot pins of the actuating levers into the bores of the bearing eyelets of the switching member. But, the locking pin is then released given the continual axial movement of the switch member to insert the pivot pins into the bearing bores. When the switch member assumes the stop position, the locking pin will have its end face residing opposite a lateral face of the detent web. For the purpose of a simplification in the production of the latchable pivot connection, a projection oriented perpendicular to the pivot axis can be provided on the actuating lever between the end faces of the locking pin and of the pivot pin extending opposite thereto. This projection comprises a wedge-like inclined guide face which helps guide the associated bearing bore of the switch member as it is being moved into engagement on the pivot pins. The inclined guide face when facing the adjacent pivot pins will guide a lug or bracket having the bearing bore into alignment with the pin.

For the possibility of achieving or limiting axial play of the connection which becomes captive because of the latch elements, further rigid stop faces coacting in pairs and acting in opposite directions can be provided. Thus, these coacting faces act in addition to the elastic locking pin and the detent web.

The only thing which must still be kept in mind for a desired axial play given such a connection is an adequate dimensioning of the length of the pivot pins. Over and above this, a corresponding dimensional allocation of the stop faces of the actuating lever and the switching member are also required for a limitation of the axial play acting in both directions, namely, in a dimensional allocation of the end face of the locking pins and those lateral faces of the actuating levers carrying the pivot pins or, respectively, of the lateral faces of the detent web and respectively one of the lateral faces of the lug having the bearing bore for the switch member.

For an at least single-sided limitation of the pivot motion of the switch member on the actuating lever, a rigid stop face corresponding in pairs can be formed by a lower edge of the switch member and an upper surface of the actuating lever. This coacting stop face will thus limit pivotal movement of the member on the lever in at least one direction.

The stop positions for the pivotal and axial displacement of the switch member can be defined in consideration of the emplacement of the housing of the phone so that the introduction of the switch member into the opening in the housing is optimally obtained. Over and above this, at least one rib forming an inclined guide edge or member can be provided on an inside wall surface of the telephone housing. This inclined rib enables the introduction of the switch member even when in an extreme pivot position or, respectively, displaced position despite a tightly dimensioned clearance between the opening in the housing wall and the member. It should be noted that to avoid the entry of dust into the inside of the telephone housing, close dimensional or tight clearance is desirable.

BRIEF DESCRIPTION OF THE DRAWINGS

FIG. 1 is a partial cross-sectional view with portions in elevation illustrating a cradle switch according to the present invention in a chassis of a telephone apparatus;

FIG. 2 is a partial perspective view of a bearing part of a switch member of the cradle switch of the present invention;

FIG. 3 is a plan view with portions broken away for purposes of illustration of the cradle switch with the switch member being disengaged;

FIG. 4. is a cross-sectional view taken on lines IV—IV of FIG. 3 with portions in elevation for purposes of illustration;

FIG. 5 is a plan view of the cradle switch of the present invention with parts assembled; and FIG. 6 is a cross-sectional view taken along lines VI—VI of FIG. 5.

DESCRIPTION OF THE PREFERRED EMBODIMENTS

The principles of the present invention are particularly useful in a cradle switch generally indicated at 100 for a telephone apparatus which has a chassis including a circuit board 12 and an outer housing 19 surrounding the chassis or carriage.

As best illustrated in FIGS. 1 and 3, the cradle switch 100 comprises a contact carrier 1, which contains a plurality of contact springs 2 interacting in spring assemblies. To actuate the contact springs, an actuating slide 3 with posts or lugs 4 for deflecting of the contact springs and a restoring spring 5 for moving the slide in one direction which is to the left as illustrated are provided in the carrier 1. It should be noted that the particular arrangement of contact springs that is illustrated is only for the purposes of illustration and any arrangement can be utilized.

The actuating slide 3 comprises a projection 6 which extends through a wall of the housing of the contact carrier 1 and presses against a transverse member 7 of an actuating lever 8. The actuating lever 8 is pivotally mounted by pivot pins 9 provided on the housing of the carrier to pivot on an axis a. As illustrated, the actuating lever 8 has a pair of arms, which are interconnected at one end by the transverse member 7 and at the opposite end by a front edge 22 to form a frame-shaped lever arm which surrounds the housing of the carrier 1.

As illustrated, detent projections 10 on the housing of the carrier 1 will limit the pivot motion of the actuating lever 8 in one direction which is illustrated as the counterclockwise direction. In the illustrated embodiment, the detent, which will limit the pivotal movement in the other direction, is formed by the transverse member 7 of the actuating lever which acts on the actuation slide 3 and will seat against a wall of the housing in the extreme depressed or deflected position. The contact springs 2 have leads that extend out of the carrier 1 and are secured to the printed circuit board 12 by solder lugs such as 11.

The actuating lever 8 in a region opposite the transverse member 7 are provided with a pair of pivot pins 13 and 14 which extend on an axis b (FIG. 5) which is parallel to the axis a. As illustrated, each of the lugs 13 and 14 extend in the same direction on the axis b with one being from each arm. A switching member 17 has a pair of correspondingly spaced projections or tabs 15 and 16 which have bearing bores or eyelets which receive the pivot pins 13 and 14 to form a pivotal connection between the member 17 and the lever 8. It is noted that the connection between the member 17 and the arm 8 not only allows pivotal movement but also longitudinal movement along the axis b within a certain range. Thus, when the printed circuit board 12 carrying the cradle switch 100 is rigidly positioned in a chassis of the telephone housing and the outer housing 19 is received on the chassis, the member 17 will extend through an opening 18 in the wall of the housing 19 in the area of a cradle for the hand piece.

The pivotal and axial displacement of the connection of the switching member 17 to the actuating lever enables an adjustment of the position of the member 17 and the movement play of the switching member during insertion of the member into the housing aperture 18 which is otherwise tightly matched to the cross-section of the member 17. A guide rib 20 is provided on the inside face of the housing 19 adjacent the clearance or opening 18 and has an inclined edge. This guide rib 20 will facilitate the introduction of the member 17 into the opening or aperture 18 when the outer housing 19 is placed on the chassis provided with the cradle switch 100.

The pivotability of the switching member 17 is limited in at least one direction by means of a corresponding stop face 21 on the member 17 which engages an upper face of a front edge 22 of the lever 8. From FIGS. 3-6, a longitudinal displaceability for the switching member 17 can be seen. While in FIGS. 3 and 4 the member is disengaged, it is shown in a position immediately approximate to the actuating lever.

When the bearing bores of the tabs or lugs 15 and 16 of the switching member 17 are put in place on the free ends of the pivots pins 13 and 14, an elastic locking pin 23 of the actuating lever 8 is deflected or bent at right angles to the movement of the member 17 because of engagement by a detent web or projection 24 of the member 17. This bent or deflected position is shown in chain lines in FIG. 4. When the switching member is slipped onto the actuating lever 8 with its two bearing bores shifted from the position illustrated in FIG. 4 towards the position illustrated in FIG. 6, the web 24 will slide off of the free end of the locking pin 23 which is then released and returns to its initial position due to the elastic force. Given the lateral faces of the lugs 15 and 16 having the bearing bores engaged on lateral surfaces such as 25 of the arm 8, a certain distance s can now be structurally provided between the end faces of the locking pin 23 and the detent web 24 of the switching member 17. The axial play of the switching member 17 on the pivot pins has this distance s.

To facilitate assembly of the member 17 on the arm 8, each of the lugs having the bearing bores such as lug 15 (FIG. 2) are provided with a collar-like projection 27 which has a semicircular configuration that surrounds a portion of the bore. In addition, a projection 26, which has an inclined surface and thus has a wedge shape, is provided on the front edge member 22 adjacent the pivot pin 13 to facilitate guiding the lug 15 with the bearing bore onto the pin 13. The collars 27 enable easy placement of the lugs with the bores in alignment with the pins so that axial movement will cause insertion of the pins such as 13 and 14 through the respective bearing bores.

The connection as discussed hereinabove easily maintains the member 17 on the lever 8 and thus a separate step of entrapping the member 17 in the housing 19 is unnecessary. Due to the pivotal connection and the displaceability, the member 17 will easily be inserted through the opening 18 when assembling the outer housing 19 onto the chassis of the telephone apparatus. It is noted that this guidance enables reducing the clearance between the member 17 and the opening 18 so as to prevent dust from entering the interior of the housing.

Although various minor modifications may be suggested by those versed in the art, it should be understood that we wish to embody within the scope of the patent granted hereon, all such modifications as reasonably and properly come within the scope of our contribution to the art.

We claim:

1. In a cradle switch for a telephone apparatus having a housing with an opening in a wall and a cradle at said opening, said cradle switch including a carrier having movable switch contacts, an actuating lever mounted at one end to the carrier for pivotal movement on a first axis to actuate the contacts, and a switch member engaging the lever to mechanically actuate the lever and extending through the opening in the wall of the housing and into the cradle, the improvements comprising the actuating lever having a frame-like configuration with a pair of parallel extending arms with the carrier of the cradle switch being positioned therebetween, and means for pivotally connecting said switch member for pivotal movement on a second axis at a free end of the arms of the lever, said first and second axes being spaced apart and extending parallel to one another, said means guiding the member for longitudinal movement with axial play relative to the second axis and including a pair of pivot pins being provided in one of the switch member and arms of the actuating lever and a pair of bearing bores for the pivot pins being provided on the other of the switch member and arms of the actuating lever to form a releasable connection.

2. The arrangement according to claim 1, wherein the pair of pivot pins are provided on the arms of the actuating lever to extend in the same direction with their free ends being orientated in said same direction.

3. The arrangement according to claim 2, wherein the pair of bearing bores are provided on the switch member and are each respectively provided with a collar-like projection having a semicircular configuration to surround a portion of each bore, said collar-like projections facilitating alignment of the bores with the pivot pins during assembly by engaging the pins during positioning of the switch member on the actuating lever.

4. The arrangement according to claim 3, wherein an elastic locking pin extends approximately parallel to the second axis between the arms of the actuating lever and wherein the switch member has a detent web positioned between the bearing bores and extending at right angles to the second axis to engage the locking pin to deflect it in a direction at right angles to the second axis during assembly, said detent web and the end of the locking pin being positioned so that with the insertion of the pivot pins into the bearing bores, the detent web disengages the locking pin and forms a lateral stop to limit axial displacement of the switch member in one direction.

5. The arrangement according to claim 4, wherein the lever has a front edge with a projection extending perpendicular to a second axis in a space between the end of the locking pin and a facing pivot pin, said projection having inclined guide faces for engaging a lug of the switch member having a bearing bore while positioning and aligning the bearing bores with the pivot pins to make the releasable connection.

6. The arrangement according to claim 5, wherein the end of the elastic locking pin and the detent web coact to form an axial limit in one direction and the edge of each collar-like projection and the corresponding lateral surface of the arm having the pivot pin coact to form a limit stop for movement in the opposite axial direction, said stops being spaced to enable axial play of a given amount.

7. The arrangement according to claim 6, wherein the switch member has a stop surface for engaging a surface on the front edge to limit pivotal movement of the switch member in one direction.

8. In a cradle switch for a telephone apparatus having a housing with an opening in a wall and cradle at said opening, said cradle switch including a carrier having movable switch contacts, an actuating lever mounted at one end to the carrier for pivotal movement to actuate the contacts, and a switch member engaging the lever to mechanically actuate the lever and extending through the opening in the wall of the housing and into the cradle, the improvements comprising said actuating lever having a pair of parallel extending arms which extend along opposite sides of the carrier of the cradle switch, and means for pivotally connecting said switch member for pivotal movement on a first axis at a free end of the lever, said means guiding the member for longitudinal movement with axial play relative to the first axis, said means including coacting pairs of pivot pins and bearing bores with the pins being provided on one of the lever and member and the bores being provided in the other of the lever and member, said pins and bores coacting to form a releasable connection.

* * * * *